Oct. 25, 1927. 1,647,098
H. S. LANOUE
BUTTER CUTTING DEVICE
Filed Oct. 12, 1925
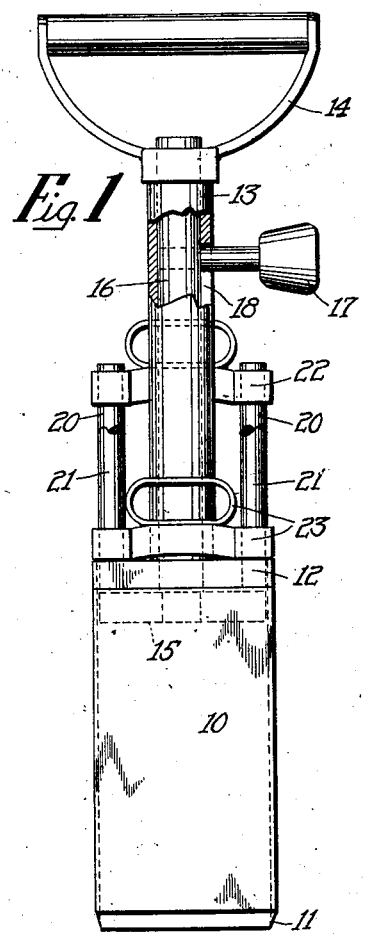
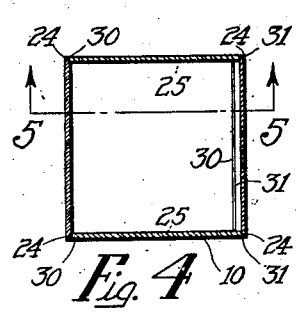
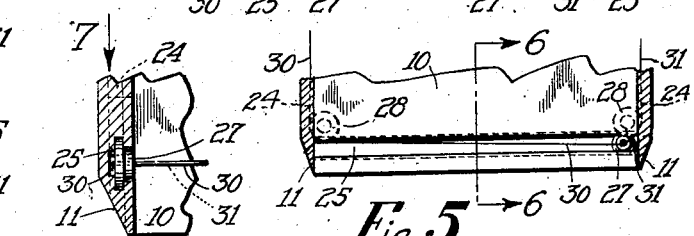
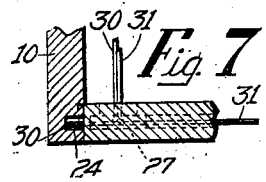
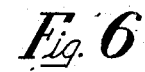
Inventor
Henry Samuel Lanoue
Attorneys Patented Oct. 25, 1927.

1,647,098

UNITED STATES PATENT OFFICE.

HENRY SAMUEL LANOUE, OF WOONSOCKET, RHODE ISLAND, ASSIGNOR OF ONE-HALF TO JACOB L. KOTLIER, OF WORCESTER, MASSACHUSETTS.

BUTTER-CUTTING DEVICE.

Application filed October 12, 1925. Serial No. 61,921.

This invention relates to a device for cutting butter from a tub or other container, the device being effective to remove a measured quantity of butter from a tub and to form this portion of butter into a uniform rectangular shape. Butter thus removed and formed presents a much more pleasing appearance than when cut out irregularly by a knife and is more readily salable. Much time is also saved by the use of this device.

It is the object of my invention to improve the construction of such a butter cutting device, rendering the device more satisfactory in operation and presenting specific advantages for the purposes set forth.

An important feature of my invention relates to the provision of improved means for severing the butter from the mass, after the butter cutting device has been inserted in the butter.

My invention further relates to arrangements and combinations of parts which will be hereinafter described and more particularly pointed out in the appended claims.

A preferred form of the invention is shown in the drawings, in which

Fig. 1 is a front elevation of my improved butter cutting device with certain parts shown in section;

Fig. 2 is a side elevation thereof with certain parts shown in section;

Fig. 3 is a view similar to Fig. 2 but showing the parts in a different position;

Fig. 4 is a sectional view, taken along the line 4—4 in Fig. 2;

Fig. 5 is an enlarged detail sectional view, taken along the line 5—5 in Fig. 4;

Fig. 6 is a detail sectional view, taken along the line 6—6 in Fig. 5;

Fig. 7 is an enlarged detail sectional view, looking in the direction of the arrow 7 in Fig. 6, and Fig. 8 is an enlarged detail plan view of certain parts to be described.

Referring to the drawings, my improved butter cutting device comprises a rectangular tubular member or body 10 which is open at its lower end and which preferably has its lower edges bevelled at the outside as shown most clearly at 11 in Fig. 6. The upper end of the tubular member 10 is closed by a head 12 secured in the tubular member and supporting a sleeve 13 fixed thereto and provided with a handle 14 at its upper end.

An ejector 15 is slidable in the member 10 and is secured at the lower end of a rod 16 movably mounted in the sleeve 13. A handle 17 projects laterally from the rod 16 through an elongated slot 18 in the sleeve 13 and constitutes means for forcing the ejector downward to remove the severed portion of butter from the tubular member 10.

The head 12 also provides a support for two pairs of guide rods 20 and 21 on which handles 22 and 23 are slidably mounted. The tubular member 10 is provided with longitudinal grooves or recesses 24 (Fig. 7) in each corner thereof and also with transverse guide ways 25 (Figs. 5 and 6) which are preferably substantially T-shaped in cross-section. Movable guide blocks 27 are slidable in the guideways 25 and may be in the form of rolls, as indicated in Figs. 5 and 8. Fixed guide rolls 28 are also mounted at the corners of the tubular member 10 adjacent the intersection of the guideways 25 and the corner grooves or recesses 24.

A single or double cutting element extends across the open lower end of the tubular member 10 from one guide block 27 to the other and this cutting element is connected for reciprocation by the handles 22 and 23. Preferably the double cutting element and connections are formed by single pieces of thin flexible steel wire such as piano wire. One of these wires 30 extends from one of the handles, as 23, downward through one of the corner recesses 24 to one of the guide rolls 28 and guideways 25, thence along the guideway to one of the guide blocks 27, thence through an axial opening therein to the other guide block 27 and back along the opposite guideway 25 and corresponding corner recess 24 to the handle 23.

A similar wire 31 extends from the other handle 22 to the guide blocks 27 and back to the handle 22, the two wires being closely adjacent and parallel between the guide blocks 27 and being suitably guided at the corners of the tubular member by the guide rolls 28.

Having described the details of construction of my improved butter cutting device, the method of use thereof will be readily understood. The device is first forced downward into the butter until the member 10 is completely filled with butter and the ejector 15 is at its extreme upper limit of travel, as shown in Fig. 2. One of the handles, as 23, is then pulled upwardly on its guide rods 21, thus tensioning the wire 30 and drawing it across the open lower end of the member 10 from the position shown in Fig. 2 to that shown in Fig. 3. By this action the butter in the tubular member 10 is easily severed from the mass in the tub by this flexible wire 30.

The entire device is then removed from the tub and the butter may be ejected by pushing downward upon the handle 17 which operates the ejector 15. The device may then be again inserted in the butter and the severing operation may be performed by pulling upward on the other handle 22 which is then in lowered position. Preferably the movement of the idle handle is yieldingly retarded during the severing operation, so that both wires 30 and 31 are tensioned and act together in cutting the butter loose from the mass. The use of two wires to form the cutting element is not always necessary.

Having thus described the operation of my improved butter cutting device and the advantages thereof, I do not wish to be limited to the details herein disclosed otherwise than as set forth in the claims, but what I claim is:—

1. The combination in a butter cutting device comprising a rectangular tubular member closed at its upper end and open at its lower end, and an ejector slidable in said tubular member, of a pair of thin flexible wires extending closely adjacent each other across the open lower end of said tubular member, and means by the use of which said wires may be tensioned manually and may be drawn simultaneously across the end of said tubular member in either direction to sever the butter contained therein.

2. The combination in a butter cutting device comprising a rectangular tubular member closed at its upper end and open at its lower end, and an ejector slidable in said tubular member, of a pair of thin flexible wires extending closely adjacent each other across the open lower end of said tubular member, and means by the use of which manual tension may be applied to one wire and a retarding pressure may be applied to the other wire, and by which both wires may be simultaneously moved under tension across the open end of said tubular member in either direction to sever the butter contained therein.

3. A butter cutting device comprising a rectangular tubular member closed at its upper end and open at its lower end and having transverse guide-ways therein, an ejector slidable in said tubular member, and a butter severing mechanism movable from side to side across said tubular member and adjacent the open lower end thereof, said severing mechanism comprising a pair of guide blocks slidable in said transverse guideways in said tubular member, a thin cutting element connecting said blocks, a pair of handles supported on said tubular member and vertically slidable relatively thereto, flexible elements connecting said handles to said guide blocks and cutting element, and guide rolls for said flexible elements fixed adjacent the lower end of said tubular member.

4. A butter cutting device comprising a rectangular member closed at its upper end and open at its lower end and having transverse guide-ways therein, an ejector slidable in said tubular member, and a butter severing mechanism movable from side to side across said tubular member and adjacent the open lower end thereof, said severing mechanism comprising a pair of guide blocks slidable in said transverse guide-ways in said tubular member, a thin cutting element connecting said blocks, a pair of handles supported on said tubular member and vertically slidable relatively thereto, flexible elements connecting said handles to said guide blocks and cutting element, and guide rolls for said flexible elements fixed adjacent the lower end of said tubular member, said tubular member having longitudinal recesses in its side walls for said flexible elements.

5. A butter cutting device comprising a rectangular tubular member closed at its upper end and open at its lower end, an ejector slidable in said tubular member, said tubular member having transverse guideways adjacent its open lower end, movable guide blocks in said guideways, a handle movably mounted on said tubular member, and a thin flexible wire extending from said handle to one of said movable guide blocks, thence across the open lower end of said tubular member to the other movable guide block and back to said handle, said wire being guided in a definite path between said handle and said guide blocks and being movable by said handle across said tubular member to sever the butter contained therein.

6. A butter cutting device comprising a rectangular tubular member closed at its upper end and open at its lower end, an ejector slidable in said tubular member, said tubular member having transverse guideways adjacent its open lower end and longitudinal enclosed recesses at its corners, movable guide blocks in said guideways, guide rolls fixed at the ends of said guideways adjacent said recesses, a pair of handles mounted for vertical reciprocation on said tubular member, and a pair of thin flexible wires, one wire extending from each handle to one of said movable guide blocks, thence across the open lower end of said tubular member to the other movable guide block and back to the same handle, and each wire being guided by certain of said fixed guide rolls, said two wires forming a double cutting element to sever the butter contained in said tubular member and being movable under tension by said handles across the open lower end of said member.

In testimony whereof I have hereunto affixed my signature.

HENRY SAMUEL LANOUE.